Sept. 16, 1958 D. B. PRESCOTT 2,852,247
DOUBLE ACTING LIQUID SPRING DAMPER
Filed May 12, 1955
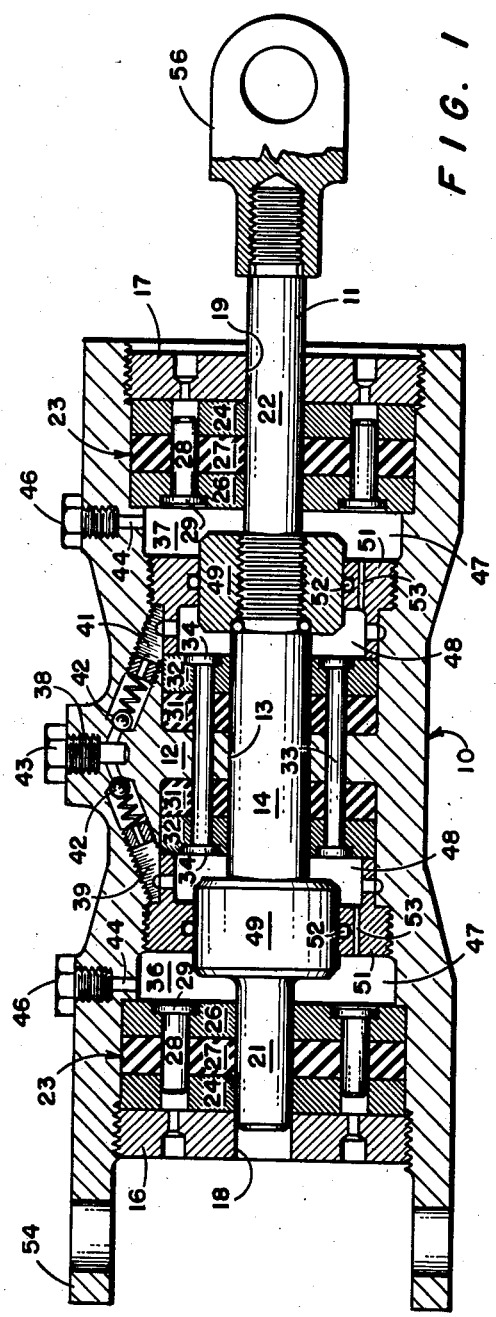
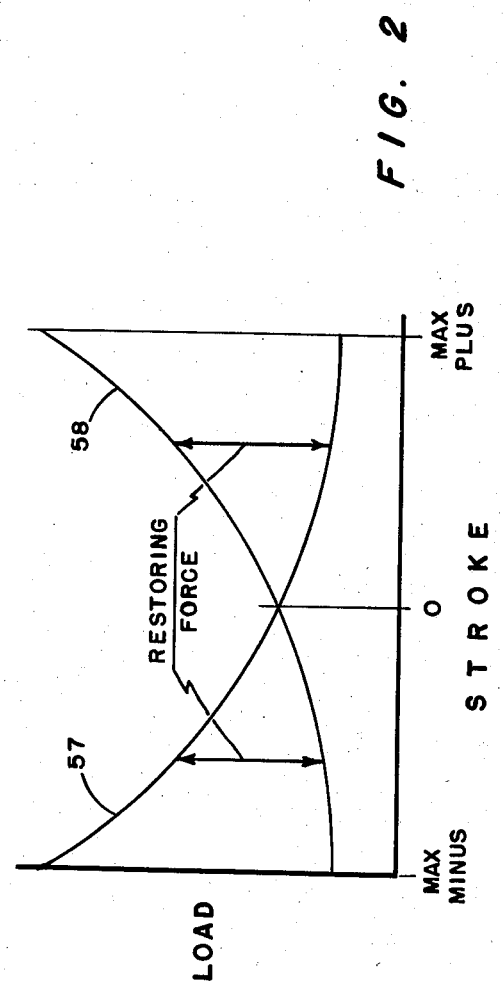
INVENTOR.
DAVID B. PRESCOTT
BY
ATTORNEY

United States Patent Office 2,852,247
Patented Sept. 16, 1958

2,852,247

DOUBLE ACTING LIQUID SPRING DAMPER

David B. Prescott, Euclid, Ohio, assignor to Cleveland Pneumatic Industries, Inc., a corporation of Ohio Application May 12, 1955, Serial No. 507,877

1 Claim. (Cl. 267—64)

This invention relates generally to spring devices and more particularly to a double acting liquid spring in combination with shock vibration damping means.

It is an important object of this invention to provide a double acting spring device which resiliently resists motion in both directions from a neutral position in combination with motion damping means.

It is another object of this invention to provide a double acting liquid spring wherein the spring resists motion in both directions from a neutral position with a resilient force which is a function of the displacement from the neutral position.

It is still another object of this invention to provide a new and improved liquid spring in combination with damping means which is suitable for use as a flutter damper on helicopters and the like.

Further objects and advantages will appear from the following description and drawings, wherein:

Figure 1 is a side elevation in longitudinal section of the preferred form of this invention; and, Figure 2 is a load stroke diagram illustrating the operation of the liquid spring shown in Figure 1.

A shock absorbing spring unit according to this invention is adapted for use in installations wherein members connected by the shock absorber must be resiliently urged toward a neutral position but require a resiliency which permits limited motion in both directions from the neutral position. Such a need is present in the mounting of the rotor blades of a helicopter wherein the mounting must provide two directional resiliency with damping means to reduce vibration.

Referring to Figure 1, the spring is provided with a cylindrical housing 10 into which a plunger 11 extends. The housing 10 is provided with a central partition 12 formed with a centrally located axially extending bore 13 which laterally supports a central portion 14 of the plunger 11. First and second end partitions 16 and 17 are threaded into opposite ends of the housing 10 and are provided with bores 18 and 19 respectively which provide lateral support for two end portions 21 and 22 of the plunger 11. A seal assembly 23 is positioned adjacent to each of the end partitions 16 and 17 and provides a fluid seal between the housing 10 and the end portions 21 and 22 of the plunger 11 thus preventing leakage of liquid along the plunger.

These seal assemblies 23 each provide backing plates 24 and 26 with a resilient seal member 27 positioned therebetween. A plurality of piston members 28 extend through the backing plates 24 and 26 and the resilient seal 27. Each of the piston members 28 is provided with a head 29 which limits axial motion relative to the associated backing plate 26. This type of high pressure seal provides a sealing force which is proportional to the pressure of the liquid being sealed. For a detailed description of the seal assembly and its operation, reference should be made to the copending application of Walter H. Hogan, Serial No. 462,214 filed October 14, 1954 and now Patent No. 2,779,645.

Adjacent to the central partition 12 is a double acting seal assembly which provides a resilient seal member 31 on each side of the central partition 12 and a pressure plate 32 engaging each resilient seal on the side thereof opposite the central partition. A plurality of pistons 33 extend through the central partition 12, the resilient seals 31 and the pressure plates 32. In this case the pistons are formed with heads 34 on both ends which limit the axial motion of the piston relative to the associated pressure plates. This seal assembly is capable of providing a sealing force proportional to the pressure being sealed regardless of the direction of the pressure drop. For a more detailed description of the operation of the double acting seal, reference should also be made to the copending application cited above.

Formed within the housing 10 adjacent to the seals 23 are two liquid filled cavities 36 and 37 located one on either side of the central partition 12 and each defining annular chambers 47 and 48, spaced by a partition member 51.

The housing 10 is formed with a main fill opening 38 and two axially extending passages 39 and 41 which connect the fill passage 38 and the chambers 48 of the cavities 36 and 37 respectively. A check valve 42 is positioned in each of the passages 39 and 41 to prevent flow of liquid from the respective chambers to the main fill opening 38, while permitting flow in the opposite direction during the charging of the device. A plug 43 is threaded into the main fill opening 38 to seal the two cavities 36 and 37 when they are filled with liquid. The housing 10 is also formed with a bleed opening 44 for each of the cavities 36 and 37 so that the air may be released from the cavities during the filling operation. Plugs 46 are used to close the bleed openings after the air is removed from the cavities.

Slidable through each partition member 51 of the cavities 36 and 37 is a piston member 49 fixed on the plunger 11. Seals 52 prevent leakage between the piston members 49 and the partitions 51. The partitions 51 are each formed with an orifice 53 which connects the associated chambers 47 and 48. When the plunger 11 moves axially relative to the housing, the piston members 49 move axially relative to the chambers 47 and 48 and displace liquid from one of the chambers and increase the volume of the other of the associated chambers so that a pressure differential is created across the orifice 53 which produces flow of liquid from one of the chambers 47 or 48 to the other of the chambers. This flow expends energy so that damping of the motion of the plunger 11 is produced which resists motion in either direction. However, since the piston members 49 are completely contained within their respective cavities 36 and 37 at all times, no change of total volume is created by the movement of the piston members 49 and they do not affect the operation of the spring mechanism about to be described.

The end portions 21 and 22 of the plunger 11 are formed with equal cross sectional areas which are smaller than the cross sectional area of the central portion 14. Therefore, axial motion of the plunger 11 to the left (as shown in Figure 1) will cause a displacement of volume in the chamber 48 of the cavity 36 equal to the differential area between the central portion 14 and the end portion 21 times the amount of the axial motion. If the cavity 36 is completely filled with liquid when the plunger 11 is in the neutral position shown, motion of the plunger 11 to the left will cause an increase of pressure in the liquid within the chambers 47 and 48 of cavity 36 which is a function of the volume displaced by the plunger movement. This will compress the liquid and produce a resilient force operating over the differential area between the central portion 14 and the end portion 21 which force urges the plunger 11 to the right. In order to effect the differential in cross sectional area, it is necessary to arrange the diameters of the two end partitions along the engagement with the plunger so that they are equal and smaller than the corresponding diameter of the central partition 12.

In a similar manner the differential area between the central portion 14 and the end portion 22 results in a reduction of the volume in the cavity 37 when the plunger 11 moves to the right (as shown in Figure 1). Therefore, if the cavity 37 is completely filled with liquid when the plunger is in the neutral position, movement of the plunger to the right will produce a resilient force urging the plunger back to the left to its neutral position. The two cavities 36 and 37 are charged with liquid at the same pressure when the plunger 11 is in the neutral position so that the pressure forces will balance out at that time. Those skilled in the art will recognize that the two liquid filled cavities 36 and 37 in cooperation with the plunger 11 form a liquid spring which is balanced when the plunger 11 is in the neutral position and which produces a restoring force proportional to the displacement from the neutral position.

The housing 10 is provided with mounting flanges 54 which are adapted to be connected to one portion of the associated equipment and the plunger 11 is provided with a mounting member 56 for connecting the plunger to its associated equipment.

In operation, any force transmitted to the plunger 11 and the housing 10 which tends to move the plunger relative to the housing causes compression of the liquid in one or the other of the cavities 36 and 37 which produces a resilient restoring force urging the plunger back to the neutral position where the pressure forces are balanced. As shown in Figure 2, the curve 57 represents the liquid spring effect of the liquid within the cavity 36 on the plunger 11 and the curve 58 represents the liquid spring effect of the liquid within the cavity 37 on the plunger 11. The two curves cross when the plunger 11 is in the neutral position at which time the pressure forces are equal. If the plunger 11 moves to the left, the pressure within the cavity 37 is reduced and the pressure within the cavity 36 is increased. This produces a restoring force urging the plunger back to the neutral position. If the motion of the plunger is to the right, the restoring force is in the opposite direction. Of course, motion of the plunger in either direction causes displacement of liquid from one or the other of the chambers 47 or 48 to the associated chamber through the orifices 53.

Since relatively small liquid springs are capable of producing extremely large resilient forces, a device according to this invention may be quite small when compared to mechanical springs or the like. Also since the damping mechanism and the liquid spring mechanism is combined into a very compact unit, additional weight reductions may be achieved. This is particularly desirable when the device is to be used in aircraft installations.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claim and not the aforesaid detailed description are determinative of the scope of the invention.

I claim:

A liquid spring comprising a housing divided into two liquid filled cavities by a central partition and an end partition on either side thereof, a plunger extending through said partitions, said plunger and housing being capable of relative axial motion in either direction from a first position of alignment, seal means adjacent to each partition preventing leakage of liquid along the plunger, the cross sectional area of the portions of the plunger extending through the end partitions being equal and different than the cross sectional area of the portion extending through said central partition, piston means on said plunger having a diameter substantially larger than the maximum diameter of said plunger dividing each of said cavities into two chambers, and fluid conducting means providing a restricted flow connection between the chambers of each of said cavities, and relative axial motion between said plunger and housing in either direction from said first position compressing the liquid in one of said cavities and producing a restoring force urging said plunger and housing in a direction toward said first position with a force which is a function of the displacement therefrom.

References Cited in the file of this patent
UNITED STATES PATENTS

| | | |
|---|---|---|
| 2,071,701 | Mejean | Feb. 23, 1937 |
| 2,099,807 | Gregory | Nov. 23, 1937 |
| 2,691,518 | Smith | Oct. 12, 1954 |
| 2,723,847 | Hogan | Nov. 15, 1955 |